United States Patent [19]

Lausberg et al.

[11] Patent Number: 4,798,855

[45] Date of Patent: Jan. 17, 1989

[54] THERMOPLASTIC MOLDING MATERIALS

[75] Inventors: Dietrich Lausberg, Ludwigshafen; Gerd Blinne, Bobenheim; Peter Ittemann, Ludwigshafen; Gerhard Heinz, Weisenheim; Erhard Seiler, Ludwigshafen; Manfred Knoll, Wachenheim, all of Fed. Rep. of Germany

[73] Assignee: BASF Aktiengesellschaft, Rheinland-Pfalz, Fed. Rep. of Germany

[21] Appl. No.: 49,226

[22] Filed: May 13, 1987

[30] Foreign Application Priority Data

May 24, 1986 [DE] Fed. Rep. of Germany ....... 3617501

[51] Int. Cl.$^4$ .................... C08L 63/02; C08L 77/00; C08L 81/06
[52] U.S. Cl. ................................ 523/435; 524/504; 524/508; 524/514; 524/538; 525/66; 525/150; 525/423; 525/425; 525/427; 525/430; 525/434; 525/906; 525/930
[58] Field of Search ............... 525/906, 930, 150, 423, 525/424, 425, 427, 430, 431, 434, 66, 429; 524/538, 504, 508, 514; 523/435

[56] References Cited

U.S. PATENT DOCUMENTS

| | | |
|---|---|---|
| 3,655,822 | 10/1970 | McGrath et al. |
| 3,714,289 | 1/1973 | Schober .................. 525/930 |
| 3,729,527 | 4/1973 | Nield ..................... 525/535 |
| 3,920,602 | 11/1975 | Freed .................... 525/930 |
| 4,574,131 | 3/1986 | Theysohn ................ 524/538 |

FOREIGN PATENT DOCUMENTS 0090404 3/1983 European Pat. Off. .
2122735 7/1970 Fed. Rep. of Germany .

Primary Examiner—John C. Bleutge
Assistant Examiner—David Buttner
Attorney, Agent, or Firm—Oblon, Fisher, Spivak, McClelland & Maier

[57] ABSTRACT

Thermoplastic molding materials contain, as essential components,
  (A) from 2 to 97.9% by weight of a nylon,
  (B) from 2 to 97.9% by weight of a polyaryl ether sulfone
  (C) from 0.1 to 30% by weight of a polymeric component having hydroxyl groups
and in addition
  (D) from 0 to 50% by weight of a rubber impact modifier and
  (E) from 0 to 60% by weight of reinforcing fillers.

11 Claims, No Drawings

THERMOPLASTIC MOLDING MATERIALS

The present invention relates to thermoplastic molding materials containing, as essential components, (A) from 2 to 97.9% by weight of a nylon,
(B) from 2 to 97.9% by weight of a polyaryl ether sulfone and
(C) from 0.1 to 30% by weight of a polymeric component having hydroxyl groups and in addition
(D) from 0 to 50% by weight of a rubber impact modifier and
(E) from 0 to 60% by weight of reinforcing fillers.

The present invention furthermore relates to the use of such molding materials for the production of moldings and to the moldings obtainable from the molding materials.

DE-A-No. 21 22 735 discloses thermoplastic molding materials of nylons and polyaryl ether sulfones. However, the mechanical properties of these materials are unsatisfactory, particularly the susceptibility to stress corrosion cracking.

Polyaryl ether sulfones containing polycaprolactam blocks in the main chain are modified according to U.S. Pat.3,655,822. However, modification of this type is technically very complicated since the water content of the starting compounds has to meet stringent requirements in the polymerization of caprolactam under alkaline conditions.

It is an object of the present invention to provide thermoplastic molding materials consisting of nylons and polyaryl ether sulfones, which are distinguished by good mechanical properties, in particular impact strength, flexural strength, tensile strength and modulus of elasticity, and moreover have good resistance to solvents and little susceptibiity to stress corrosion cracking.

We have found that this object is achieved, according to the invention, by the thermoplastic molding materials defined at the outset.

Preferred materials of this type are described in the subclaims.

The novel thermoplastic molding materials contain, as component (A), a nylon or a mixture of several nylons. Partially crystalline and amorphous nylons are suitable in principle, but partially crystalline nylons are preferred since the molding materials produced from them generally have superior heat distortion resistance and stress cracking resistance compared with those obtained from amorphous nylons. Nylons which can be used according to the invention are known per se and include, for example, nylons having molecular weights of 5,000 or more, as described in, for example, U.S. Pat. Nos. 2,071,250, 2,071,251, 2,130,523, 2,130,948, 2,241,322, 2,312,966, 2,512,906 and 3,393,210.

The nylons can be prepared, for example, by condensation of equimolar amounts of a saturated dicarboxylic acid of 4 to 12 carbon atoms with a diamine of 4 to 14 carbon atoms, by condensation of $\Omega$-aminocarboxylic acids or by polyaddition of lactams. Examples of nylons are polyhexamethylene adipamide (nylon 66), polyhexamethylene azelamide (nylon 69), polyhexamethylene sebacamide (nylon 610), polyhexamethylenedodecanediamide (nylon 612), the nylons obtained by subjecting lactams to ring-opening reactions, eg. polycaprolactam and polylaurolactam, and nylons based on poly-11-aminoundecanoic acid, di-(p-aminocyclohexyl)-methane and dodecanedioic acid. It is also possible to use, according to the invention nylons which are prepared by copolycondensation of two or more of the abovementioned polymers or their components, for example a copolymer of adipic acid, isophthalic acid and hexamethylenediamine. The nylons are preferably linear and have melting points higher than 200° C.

Preferred nylons are polyhexamethylene adipamide, polyhexamethylene sebacamide and polycaprolactam. The nylons generally have a relative viscosity of from 2.5 to 5, determined on a 1% strength by weight solution in $H_2SO_4$ at 23° C.; this corresponds to a weight average molecular weight of about 15,000–45,000. Mixtures of nylons can of course also be used. The amount of nylon A in the novel molding materials is not less than 2% by weight, based on the total weight. Molding materials containing from 10 to 78, in particular from 20 to 67, % by weight of nylon are particularly preferred.

The novel molding materials contain, as component B, a polyaryl ether sulfone or a mixture of several polyaryl ether sulfones. For the purposes of the present invention, polyaryl ether sulfones are homo- and copolycondensates which contain, in the main chain, sulfonyl groups bonded to aromatic radicals, and whose repeating units are linked via ether bridges.

Preferably used polyaryl ether sulfones are those of the general formula I

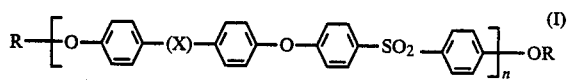

where X is C $(CH_3)_2$— or —$SO_2$— and n is an integer from 30 to 100, preferably from 40 to 80. However, aromatic polysulfones which consist of not less than 50% by weight, based on the total weight of the aromatic polysulfones, of units of the formula I and additionally contain condensed units of comonomers have also proven useful. The preferred comonomers are those which give condensed units having structures of the formula II

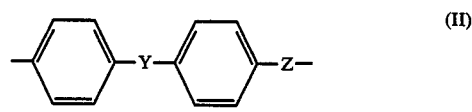

where Y is —O—, —S—, —S—S—, —CO—, —$CH_2$—, —$CH_2$—$CH_2$—,

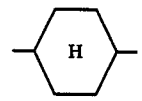

a —$C(CH_3)_2$ group or a chemical bond and
Z is —O— or —$SO_2$—.

The phenyl radicals in the general formulae I and II and in formulae III to V below may furthermore be substituted by $C_1$-$C_6$-alkyl or alkoxy. However, the unsubstituted derivatives are preferred.

The polyaryl ether sulfone may also possess units of the general formulae

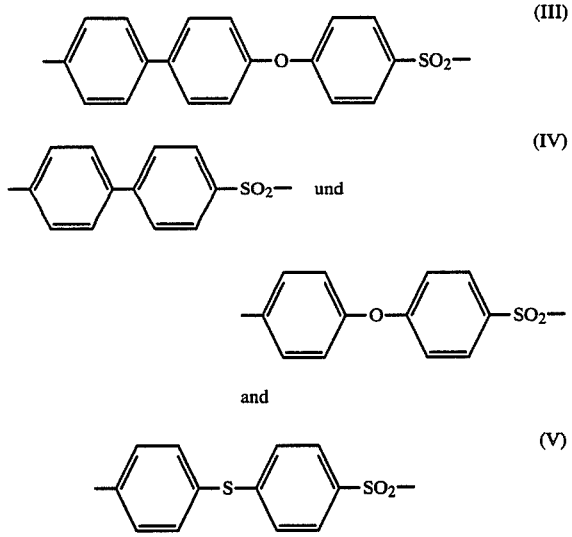

in the main chain, and these units may be present in different proportions.

The terminal groups R in formula I may be hydrogen or alkyl of 1 to 6 carbon atoms, in particular methyl or ethyl. The type of terminal groups is dependent on the method of preparation. Polyaryl ether sulfones of this type and processes for their preparation are known per se. They can be obtained, for example, by reacting double salts of alkali metals of dihydric mononuclear or dinuclear phenols with an equimolar amount of 4,4'-dichlorodiphenyl sulfone, as described in British Patent Nos. 1,016,245, 1,060,546, 1,109,842, 1,122,192 and 1,133,561 and German Patent No. 1,938,806.

Aromatic polyaryl ether sulfones of this type generally have molecular weights of from 15,000 to 50,000, preferably from 20,000 to 40,000, and relative viscosities (measured at 20° C. in 1% strength by weight N-methyl-pyrrolidone solution) of from 0.35 to 0.85, preferably from 0.40 to 0.70.

As in the case of component A, the content of component B in the novel molding materials is not less than 2% by weight; contents from 20 to 88, in particular from 30 to 75, % by weight, based on the total weight of components (A) to (E), are preferred.

The novel molding materials contain, as essential component C, a polymeric component having hydroxyl groups. The experiments carried out showed that in principle any group which acts as a proton donor should be suitable, but that groups containing the structural unit —OH are particularly useful. The compatibility-improving effect of component C is most probably due to the fact that interactions, for example H bridges, occur between component C and components (A) and (B), resulting in better adhesion between the phases.

As stated above, all hydroxyl-containing polymers which are essentially readily available are in principle suitable. Care should of course be taken to ensure that components (A) and (B) are stable to component C. Particular attention should be paid to this when compounds containing acidic OH groups are used.

Under these preconditions, certain groups of compounds have proven particularly advantageous, and these groups are described below. However, it is possible in principle to use other components C, provided that the stability of components (A) and (B) does not suffer as a result.

The first group of particularly suitable polymers comprises polycondensates of aliphatic or aromatic diols or polyhydric alcohols with epihalohydrins. Compounds of this type and processes for their preparation are familiar to the skilled worker and further information is therefore unnecessary here. In principle, aliphatic or aromatic diols are suitable. Particularly preferred dihydroxy compounds are the diols used for the preparation of polycarbonates.

A polycondensate of bisphenol A and epichlorohydrin, having the structure

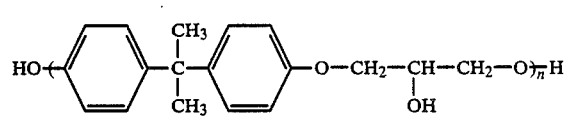

is readily available and is therefore preferably used.

Apart from the possibility of using polymers which already contain the hydroxyl group in the main chain, it is also possible to employ polymers or copolymers which are provided with these functional groups by the concomitant use of suitable monomers in the polymerization; in this case, the polymers may contain the groups not only in the main chain but also in substituents of the main chain. In another possible method, suitable OH-containing monomers are grafted onto grafting bases, suitable grafting bases being, in principle, all polymers which are not completely incompatible with the components (A) and (B). A certain degree of incompatibility can be compensated by increasing the amount of hydroxyl groups.

Examples of suitable components C are therefore polymers based on polyolefins, polystyrene and rubber elastomers, which possess hydroxyl groups —OH and are obtainable either by using suitable comonomers or by grafting on the functional groups —OH. The amount of hydroxyl-containing comonomers or graft monomers depends on the degree of compatibility of the base polymer with the components (A) and (B). The better the compatibility, the smaller the amount of OH groups can be. From the above statements, it is clear that a large number of polymers are suitable as component C; of these polymers, some particularly preferred types are described in detail below, merely by way of example.

The first group comprises polymers and copolymers containing not more than 100 mol % of vinylphenylcarbinols, vinylphenyldimethylcarbinols and in particular vinylphenylhexafluorodimethylcarbinol having proven particularly useful. Once again, advantageous base polymers or grafting bases are the abovementioned types of polymers.

The second group comprises polymers based on vinylphenols and copolymers of the abovementioned base polymers with vinylphenols, which may also contain substituents in the nucleus. Substituents which increase the acidity of the phenolic hydrogen are particularly suitable, for example halogen substituents as well as other electronattracting substituents.

A third group comprises phenol/formaldehyde polycondensates which are uncrosslinked and soluble. These products may be linear or branched.

Further examples are in principle polymers and copolymers of all polymerizable or graftable alcohols.

It should be mentioned that OH-containing polymers based on nylons or polyaryl ether sulfones are particularly preferred since in these cases compatibility with one or both of components (A) and (B) is present from the outset, so that the amount of OH groups can be reduced.

Component (C) can be prepared by conventional methods of polycondensation or graft polymerization or copolymerization, so that further information is unnecessary here.

The amount of component C in the novel molding materials is from 0.1 to 30% by weight, based on the total weight of the components (A) to (C), and depends on the compatibility of the base polymer of component (C) with components (A) and (B). In general, amounts of from 1 to 25, in particular from 3 to 20, % by weight have proven particularly advantageous.

In addition to components (A) to (C), the novel molding materials can contain rubber impact modifiers as component D for improving the impact strength. Elastomers (rubbers) which improve the impact strength and are suitable for nylons are familiar to the skilled worker.

Examples are rubbers based on ethylene, propylene, butadiene, or acrylates or mixtures of these monomers.

Polymers of this type are described in, for example, Houben-Weyl, Methoden der organischen Chemie, vol. 14/1 (Georg-Thieme Verlag, Stuttgart 1961), pages 392–406, and in the monograph by C. B. Bucknall, Toughened Plastics, (Applied Science Publishers, London, 1977).

A few preferred types of such elastomers are described below.

A first preferred group comprises the ethylene/propylene (EPM) and ethylene/propylene/diene (EPDM) rubbers, which preferably have a ratio of ethylene radicals to propylene radicals of from 40:60 to 65:35.

The Mooney viscosities (MLI+4/100° C.) of such uncrosslinked EPM and EPDM rubbers (gel contents generally less than 1% by weight) are preferably from 25 to 100, in particular from 35 to 90, measured using a large rotor after a running time of 4 minutes at 100° C., according to DIN 53,523).

EPM rubbers generally contain virtually no residual double bonds, whereas EPDM rubbers may contain from 1 to 20 double bonds per 100 carbon atoms.

Examples of diene monomers of EPDM rubbers are conjugated dienes, such as isoprene and butadiene, non-conjugated dienes of 5 to 25 carbon atoms, such as 1,4-butadiene, 1,4-hexadiene, 1,5-hexadiene, 2,5-dimethyl-1,5-hexadiene and 1,4-octadiene, cyclic dienes, such as cyclopentadiene, cyclohexadiene, cyclooctadiene and dicyclopentadiene, alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]deca-3,8-diene and mixtures of these. 1,5-hexadiene, 5-ethylidenenorbornene and dicyclopentadiene are preferred. The diene content of the EPDM rubbers is preferably from 0.5 to 10, in particular from 1 to 8, % by weight, based on the total weight of the rubber.

EPM and EPDM rubbers can also be grafted with reactive carboxylic acids or their derivatives. Typical examples of these are acrylic acid, methacrylic acid and their derivatives, and maleic anhydride. Ethylene/acrylic acid/acrylate terpolymers and the corresponding copolymers with methacrylic acid and its esters may be mentioned as examples.

Another group of preferred rubbers are copolymers of ethylene with acrylates and/or methacrylates, in particular those which additionally contain epoxide groups. These epoxide groups are preferably incorporated in the rubber by adding to the monomer mixture epoxide-containing monomers of the general formula II or III

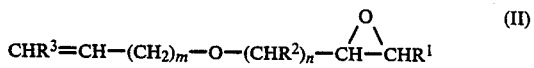

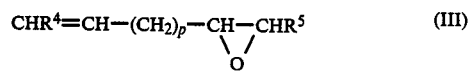

where $R^1$, $R^2$, $R^3$, $R^4$ and $R^5$ are each hydrogen or alkyl of 1 to 6 carbon atoms, m is an integer from 0 to 20, n is an integer from 0 to 10 and p is an integer from 0 to 5.

$R^1$, $R^2$ and $R^3$ are each preferably hydrogen, m is preferably 0 or 1 and n is preferably 1. The corresponding compounds are alkyl glycidyl ethers or vinyl glycidyl ethers.

Preferred examples of compounds of the formula II are epoxide-containing esters of acrylic acid and/or methacrylic acid, particularly preferred esters of this type being glycidyl acrylate and glycidyl methacrylate.

The ethylene content of the copolymers is in general from 50 to 98% by weight, and the content of epoxide-containing monomers and that of the acrylate and/or methacrylate are each from 1 to 49% by weight.

Particularly preferred copolymers are those consisting of from 50 to 98, in particular from 60 to 95, % by weight of ethylene, from 1 to 40, in particular from 2 to 20, % by weight of glycidyl acrylate and/or glycidyl methacrylate and from 1 to 45, in particular from 10 to 35, % by weight of n-butyl acrylate and/or 2-ethylhexyl acrylate.

Other preferred esters of acrylic acid and/or methacrylic acid are the methyl, ethyl, propyl, isobutyl and tert-butyl esters.

Vinyl esters and vinyl ethers can also be used as comonomers.

The ethylene copolymers described above can be prepared by a conventional process, preferably by random copolymerization under high pressure at elevated temperatures. Appropriate processes are described in the literature. ature.

The melt flow index of the ethylene copolymers is in general from 1 to 80 g/10 min (measured at 190° C. and under a load of 2.16 kg).

Other preferred elastomers (rubbers) (D) are graft copolymers with butadiene, butadiene/styrene, butadiene/acrylonitrile and acrylates, as described in, for example, DE-A-No. 16 94 173 and DE-A-No. 23 48 377.

Particular examples of these are the ABS polymers as described in DE-A-No. 20 35 390, DE-A-No. 22 48 242 and EP-A-No. 22 216, those described in EP-A-No. 22 216 being particularly preferred.

Other suitable rubbers (D) are graft polymers of from 25 to 98% by weight f an acrylate rubber having a glass transition temperature of less than −20° C., as the grafting base, and from 2 to 75% by weight of a copolymerizable ethylenically unsaturated monomer whose homopolymers or copolymers have a glass transition temperature higher than 25° C., as the graft.

The grafting bases are acrylate or methacrylate rubbers in which not more than 40% by weight of other comonomers may be present. The $C_1$–$C_8$-esters of acrylic acid and methacrylic acid and their halogenated derivatives and aromatic acrylates and mixtures of these are preferred. Examples of comonomers in the grafting base are acrylonitrile, methacrylonitrile, styrene, α-methylstyrene, acrylamides, methacrylamides and vinyl-$C_1$–$C_6$-alkyl ethers.

The grafting base can be uncrosslinked or partially or completely crosslinked. Crosslinking is achieved by copolymerization of, preferably, from 0.02 to 5, in particular from 0.05 to 2, % by weight, of a crosslinking monomer containing more than one double bond. Suitable crosslinking monomers are described in, for example, DE-A-No. 27 26 256 and EP-A-No. 50 265.

Preferred crosslinking monomers are triallyl cyanurate, triallyl isocyanurate, triacryloylhexahydro-s-triazine and trialkylbenzenes.

If the crosslinking monomers contain more than 2 polymerizable double bonds, it is advantageous to restrict their amount to no more than 1% by weight, based on the grafting base.

Particularly preferred grafting bases are emulsion polymers having a gel content of more than 60% by weight (determined in dimethylformamide at 25° C. according to M. Hoffmann, H. Krömer and R. Kuhn, Polymeranalytik, Georg-Thieme Verlag, Stuttgart, 1977).

Other suitable grafting bases are acrylate rubbers having a diene core, as described in, for example, EP-A-No. 50 262.

Particularly suitable graft monomers are styrene, α-methylstyrene, acrylonitrile, methacrylonitrile and methyl methacrylate and mixtures of these, in particular mixtures of styrene and acrylonitrile in a weight ratio of from 90:10 to 50:50.

The grafting yield, i.e. the quotient of the amount of grafted monomer and the amount of graft monomer used is in general from 20 to 80% by weight.

Rubbers based on acrylates, which can be used according to the invention, are described in, for example, DE-A-No. 24 44 584 and DE-A-No. 27 26 256.

The rubbers C preferably have a glass transition temperature of less than −30° C., in particular less than −40° C., which results in good impact strength even at low temperatures.

It is of course also possible to use blends of the above-mentioned types of rubbers.

Examples of reinforcing fillers are asbestos, carbon and, preferably, glass fibers, the glass fibers being used in the form of, for example, glass fabrics, glass mats, surfacing mats and/or preferably glass rovings or chopped glass strands of low-alkali E glasses having a diameter of from 5 to 200, preferably from 8 to 15, μm, which, after they have been incorporated, have a mean length of from 0.05 to 1 mm, preferably from 0.1 to 0.5 mm.

Examples of other suitable fillers are wollastonite, calcium carbonate, glass spheres, powdered quartz, silicon nitride and boron nitride, as well as mixtures of these fillers.

Among the abovementioned reinforcing fillers, glass fibers have proven particularly advantageous, especially where very high heat distortion resistance is required.

The amount of component (E) is from 0 to 60, preferably from 2 to 50, in particular from 5 to 30, % by weight, based on the total weight of the molding materials.

Preferred molding materials containing glass fibers and rubber impact modifiers have the following compositions:

Component A (nylon): from 10 to 76, in particular from 20 to 57, % by weight
Component B (polyaryl ether sulfone): from 20 to 86, in particular from 30 to 67, % by weight
Component C (OH-containing polymer): from 1 to 25, in particular from 3 to 20, % by weight
Component D (rubber): from 1 to 25, preferably from 5 to 20, % by weight Component E (glass fibers and/or mineral fillers: from 2 to 50, in particular from 5 to 30, % by weight.

In addition to components (A) to (E), the novel molding materials may contain conventional additives and processing assistants. The amount of these is in general not more than 60, preferably not more than 50, % by weight, based on the total weight of components (A) to (E).

Examples of conventional additives are stabilizers and antioxidants, heat stabilizers and UV stabilizers, lubricants, mold release agents, colorants, such as dyes and pigments, fibrous and powdered fillers and reinforcing agents, nucleating agents and plasticizers.

Examples of antioxidants and heat stabilizers which may be added to the thermoplastic materials according to the invention are halides of metals of group I of the periodic table, for example sodium halides, potassium halides and lithium halides, with or without copper(I) halides, e.g. chlorides, bromides or iodides. Sterically hindered phenols, hydroquinones, substituted members of this group and mixtures of these can also be used, preferably in concentrations of not more than 1% by weight, based on the weight of the mixture.

Examples of UV stabilizers are various substituted resorcinols, salicylates, benzotriazoles and benzophenones, which are generally used in amounts of not more than 2.0% by weight.

Lubricants and mold release agents, which are generally added in amounts of not more than 1% by weight, based on the thermoplastic material, are stearic acids, stearyl alcohol, stearates and stearamides, as well as the fatty acid esters of pentaerythritol.

Organic dyes, such as nigrosine, and pigments, e.g. titanium dioxide, cadmium sulfide, cadmium sulfide selenide, phthalocyanines, ultramarine blue or carbon black can also be added. The novel molding materials may furthermore contain fibrous and powdered fillers and reinforcing agents, such as carbon fibers, glass fibers, amorphous silica, asbestos, calcium silicate, calcium metasilicate, magnesium carbonate, kaolin, chalk, powdered quartz, mica or feldspar, in amounts of not more than 50% by weight, based on components (A) to (E). Nucleating agents, such as talc, calcium fluoride, sodium phenyl phosphinate, alumina or finely divided polytetrafluoroethylene, can be used in amounts of, for example, not more than 5% by weight, based on components (A) to (E).

The novel molding materials can be prepared by conventional mixing methods, for example by incorporating the polyaryl ether sulfone into the nylon at above the melting point of polyaryl ether sulfone, in particular at from 250 to 350°C., especially from 280 to 320°C., in a conventional mixing apparatus, such as an extruder, kneader or mixer. Where they are used, components D and E are added.

The novel molding materials can readily be converted to moldings having a good surface quality and improved impact strength coupled with high rigidity, particularly at low temperatures. No separation of the polymer components takes place either in the molding or in the melt.

EXAMPLES

The starting materials below were used for the preparation of the thermoplastic molding materials according to the invention.

Component A (nylons):
  A 1: Polyhexamethyleneadipamide having a relative viscosity of 3.31, measured on a 1% strength solution in 96% strength $H_2SO_4$ at 25° C.
  A 2: Polycaprolactam having a relative viscosity of 4.0 (measured as for A 1).
  A 3: Polyhexamethylenesebacamide having a relative viscosity of 3.23 (measured as for A 1).
  A 4: Nylon prepared from hexamethylenediamine and a mixture of isophthalic acid and terephthalic acid (weight ratio 60:40) and having a relative viscosity of 1.91, measured on a 1% strength by weight solution in concentrated sulfuric acid at 25° C.

Component B
  B 1: Polyaryl ether sulfone having the structure

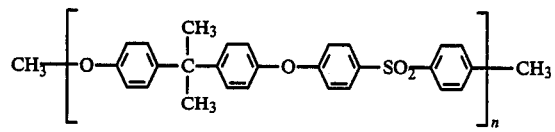

and a relative viscosity $\eta_{rel}$ of 0.6 measured in a 1% strength by weight solution in N-methylpyrrolidone at 25° C.
  B 2: Polyaryl ether sulfone having the structure

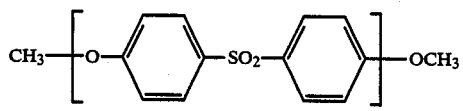

and a relative viscosity $\eta_{rel}$ of 0.55 (measured as for B 1).

Component C:
  C: Polyconensate of 2,2-di-(4-hydroxyphenyl)propane and epichlorohydrin (Phenoxy ™, Union Carbide), having a relative viscosity of 1.13, measured in a 0.5% strength by weight solution in dichloromethane at 25° C. Structure:

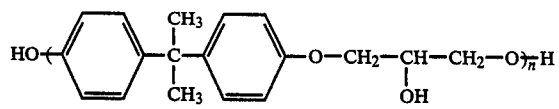

Component D:
The following rubbers were used to improve the impact strength:
  D 1: Graft rubber having a grafting base (75% by weight) of poly-n-butyl acrylate which was reacted with butanediol diacrylate, and a grafted shell (25% by weight) of a copolymer of styrene and acrylonitrile (weight ratio 75:25), prepared in a conventional manner by emulsion polymerization. (Median particle size $d_{50}=2500$ nm).
  D 2: Graft rubber having a grafting base of polybutadiene (75%) and a grafted shell (25%) of a copolymer of styrene and acrylonitrile (weight ratio 75:25), prepared in a conventional manner by emulsion polymerization ($d_{50}=250$ nm).
  D 3: Terpolymer of ethylene, n-butyl acrylate and acrylic acid (weight ratio 65:30:5), prepared in a conventional manner by high pressure polymerization. (MFI (melt flow index)=10 g/10 min at 190° C. and under 2.16 kg).

The median particle diameter $d_{50}$ is the diameter above and below which lie the diameters of 50% by weight of the particles.

The molding materials were prepared by thoroughly mixing the components, melting and homogenizing the mixture in a twin-screw extruder at 300° C. and extruding the melt into a waterbath. After granulation and drying, the mixture was shaped to test specimens on an injection molding machine and the said specimens were investigated without further aftertreatment.

The hole impact strength was determined according to DIN 53,753. The results are shown in Tables 1 and 2, together with the composition of the individual molding materials (all % are by weight).

Table 2 shows, that, by modification with rubber, the impact strength of the molding materials can be substantially increased further, particularly the low temperature impact strength.

TABLE 1

(all data in % by weight)

| Example | Component B % | Type | Component A % | Type | C % | Hole impact strength (kJ/m²) according to DIN 53,753 23° C. | −20° C. | −40° C. |
|---|---|---|---|---|---|---|---|---|
| 1 | 50 | B1 | 50 | A2 | — | 7 | 7 | 7 |
| 2 | 50 | B1 | 50 | A1 | — | 4 | 4 | 4 |
| 3 | 50 | B1 | 50 | A3 | — | 10 | 10 | 10 |
| 4 | 50 | B2 | 50 | A2 | — | 16 | 14 | 14 |
| 5 | 50 | B2 | 50 | A3 | — | 16 | 12 | 11 |
| 6 | 45 | B1 | 45 | A2 | 10 | 102 | 45 | 35 |
| 7 | 45 | B1 | 45 | A1 | 10 | 85 | 40 | 32 |
| 8 | 45 | B1 | 45 | A3 | 10 | 80 | 50 | 45 |
| 9 | 45 | B2 | 45 | A2 | 10 | 35 | 30 | 25 |
| 10 | 45 | B2 | 45 | A3 | 10 | 40 | 30 | 25 |
| 11 | 70 | B1 | 25 | A2 | 5 | 91 | 56 | 43 |
| 12 | 70 | B2 | 25 | A3 | 5 | 75 | 46 | 38 |
| 13 | 30 | B1 | 63 | A1 | 7 | 76 | 39 | 26 |
| 14 | 45 | B1 | 45 | A4 | 10 | 53 | 46 | 42 |

TABLE 2

(all data in % by weight)

| Example | Component B % | Type | Component A % | Type | C % | D % | Type | Hole impact strength (kJ/m²) according to DIN 53,753 23° C. | −20° C. | −40° C. |
|---|---|---|---|---|---|---|---|---|---|---|
| 15 | 45 | B1 | 45 | A3 | 5 | 5 | D3 | 96 | 91 | 74 |
| 16 | 45 | B1 | 45 | A2 | 5 | 5 | D2 | 98 | 90 | 83 |
| 17 | 40 | B1 | 40 | A3 | 5 | 15 | D3 | 110 | 108 | 108 |
| 18 | 40 | B1 | 40 | A3 | 5 | 15 | D1 | 106 | 84 | 73 |
| 19 | 45 | B2 | 25 | A2 | 5 | 5 | D3 | 89 | 76 | 72 |
| 20 | 25 | B2 | 45 | A3 | 5 | 5 | D3 | 110 | 90 | 78 |

TABLE 2-continued

| | (all data in % by weight) | | | | | | | | |
|---|---|---|---|---|---|---|---|---|---|
| | Component | | | | | | Hole impact strength (kJ/m$^2$) according to DIN 53,753 | | |
| | B | | A | | C | D | | | |
| Example | % | Type | % | Type | % | % | Type | 23° C. | −20° C. | −40° C. |
| 21 | 25 | B2 | 45 | A1 | 5 | 5 | D3 | 85 | 64 | 53 |
| 22 | 45 | B2 | 45 | A3 | 5 | 5 | D2 | 109 | 93 | 86 |

We claim:

1. A thermoplastic molding material containing, as essential components,
   (A) from 2 to 97.9% by weight of a nylon,
   (B) from 2 to 97.9% by weight of a polyaryl ether sulfone,
   (C) from 0.1 to 30% by weight of a polymeric component having hydroxyl groups said polymeric component being selected from the group consisting of (i) polycondensates of aliphatic or aromatic diols or polyhydric alcohls with epihalohydrins, (ii) polymers and copolymers of vinylphenyl carbinols and vinylphenyldimethyl carbinols, (iii) polymers of vinylphenols, (iv) OH group-containing nylons said nylons being different than the nylons of component (A), (v) OH group-containing polyaryl ether sulfones said sulfones being different than the polyaryl ether sulfones of component (B) and (vi) phenyl/formaldehyde polycondensates and in addition
   (D) from 0 to 50% by weight of a rubber impact modifier and
   (E) from 0 to 60% by weight of reinforcing fillers.

2. A thermoplastic molding material as claimed in claim 1, wherein the content of
   (E) reinforcing filers is from 2 to 50% by weight.

3. A molding obtainable from a molding material as claimed in claim 1.

4. The thermoplastic molding material of claim 1, wherein component (C) is a polycondensate of aliphatic or aromatic diols or polyhydric alcohols with epihalohydrins.

5. The thermoplastic molding material of claim 4, wherein component (C) is a polycondensate of bisphenol A and epichlorohydrin.

6. The thermoplastic molding material of claim 1, wherein component (C) is a polymer or copolymer of vinylphenyl carbinols and vinylphenyl dimethyl carbinols.

7. The thermoplastic molding material of claim 1, wherein component (C) is a vinylphenol polymer.

8. The thermoplastic molding material of claim 1, wherein component (C) is an OH group-containing nylon, wherein said OH group-containing nylon is different than the nylon of component (A).

9. The thermoplastic molding material of claim 1, wherein component (C) is an OH group-containing polyaryl ether sulfone, wherein said OH group-containing sulfone is different than the polyaryl ether sulfone of component (B).

10. The thermoplastic molding material of claim 1, wherein component (C) is a phenol-formaldehyde polycondensate.

11. The thermoplastic molding material of claim 1, wherein component (C) is a copolymer of a polyolefin, polystyrene or a rubber elastomer with a vinylphenol.

* * * * *